US008661290B2

(12) United States Patent
Duron et al.

(10) Patent No.: US 8,661,290 B2
(45) Date of Patent: Feb. 25, 2014

(54) SAVING POWER IN COMPUTING SYSTEMS WITH REDUNDANT SERVICE PROCESSORS

(75) Inventors: Mike C. Duron, Pflugerville, TX (US); Mark D. McLaughlin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 13/006,987

(22) Filed: Jan. 14, 2011

(65) Prior Publication Data

US 2012/0185726 A1 Jul. 19, 2012

(51) Int. Cl.
*G06F 11/00* (2006.01)

(52) U.S. Cl.
USPC .......................................................... 714/11

(58) Field of Classification Search
None
See application file for complete search history.

(56) References Cited

U.S. PATENT DOCUMENTS

| | | | |
|---|---|---|---|
| 6,148,415 A | 11/2000 | Kobayashi et al. | |
| 6,931,568 B2 * | 8/2005 | Abbondanzio et al. | ......... 714/11 |
| 6,957,353 B2 * | 10/2005 | Bresniker et al. | ............. 713/320 |
| 7,017,074 B2 | 3/2006 | Okin | |
| 7,171,524 B2 * | 1/2007 | Kobayashi et al. | ........... 711/147 |
| 7,251,746 B2 | 7/2007 | Fox et al. | |
| 2002/0194531 A1 | 12/2002 | Lerman | |
| 2006/0090064 A1 | 4/2006 | Michaelis et al. | |

* cited by examiner

*Primary Examiner* — Michael Maskulinski
(74) *Attorney, Agent, or Firm* — Francis Lammes; Stephen J. Walder, Jr.; Libby Z. Toub

(57) ABSTRACT

A mechanism is provided for saving power in redundant service processors of the data processing system. A redundant service processor places a plurality of components into a low power state in response to receiving a primary control signal from a primary service processor within a first predetermined time period. The redundant service processor monitors for a signal within a second predetermined time period from the primary service processor. The redundant service processor determines whether the signal is a heartbeat signal or an activate signal in response to receiving the signal from the primary service processor within the second predetermined time period. Responsive to receiving the activate signal, the redundant service processor wakes-up the plurality of components that are in the low-power state in order for the redundant service processor to collect data and recover the data processing system in an event of a failure.

18 Claims, 4 Drawing Sheets

SAVING POWER IN COMPUTING SYSTEMS WITH REDUNDANT SERVICE PROCESSORS

BACKGROUND

The present application relates generally to an improved data processing apparatus and method and more specifically to mechanisms for saving power in computing systems with redundant service processors.

A service processor may be integrated within a computing system that constantly monitors the system's vital signs. Thus, a service processor may be thought of as a computer within a computer. In the event of a malfunction within the computing system, the service processor may react, often before any problem is apparent to users or system administrators, in order to correct or reduce the time for correction of the computing system. This systems management function of the service processor allows many problems to be corrected and system function restored remotely without interruption.

A service processor may also help in the analysis of a computing system that will not boot. That is, support personnel may remotely log into the service processor to review error logs and perform remote maintenance. A service processor may also enable First Failure Data Capture, which virtually eliminates the need to recreate intermittent errors, which is a time-consuming, inefficient, and sometimes impossible process.

Additionally, a computing system may be built with redundant parts to reduce single points of failure. Thus, a computing system may comprise redundant service processors to reduce the chance of hardware or software in the event of a failure of a primary service processor.

SUMMARY

In one illustrative embodiment, a method, in a data processing system, is provided for saving power in redundant service processors of the data. processing system. Responsive to receiving a primary control signal from a primary service processor within a first predetermined time period, the illustrative embodiments place a plurality of components into a low power state. The illustrative embodiment monitors for a signal within a second predetermined time period from the primary service processor. Responsive to receiving the signal from the primary service processor within the second predetermined time period, the illustrative embodiment determines whether the signal is a heartbeat signal or an activate signal. Responsive to receiving the activate signal, the illustrative embodiment wakes-up the plurality of components that are in the tow-power state in order for the redundant service processor to collect data and recover the data processing system in an event of a failure.

in other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As previously stated, a computing system may be built with redundant parts to reduce single points of failure. Therefore, a computing system may comprise a primary service processor and one or more redundant service processors to reduce the chance of hardware or software failure in the event of a failure of the main service processor. However, in current computing system, each redundant service processor must be running all the time and, thus, consume as much power as the primary service processor.

The illustrative embodiments provide a mechanism for reducing the power consumption of redundant service processors in a computing system during boot and runtime. Components of the redundant service processors will remain in a low power state while other components of the redundant service processors monitor the primary service processor until a failure is detected in the main service processor or the main service processor indicates that a redundant service processor needs to take over control. In such an instance, the redundant service processor resumes a normal power state in order to collect data and recover the computing.

Figure 1:
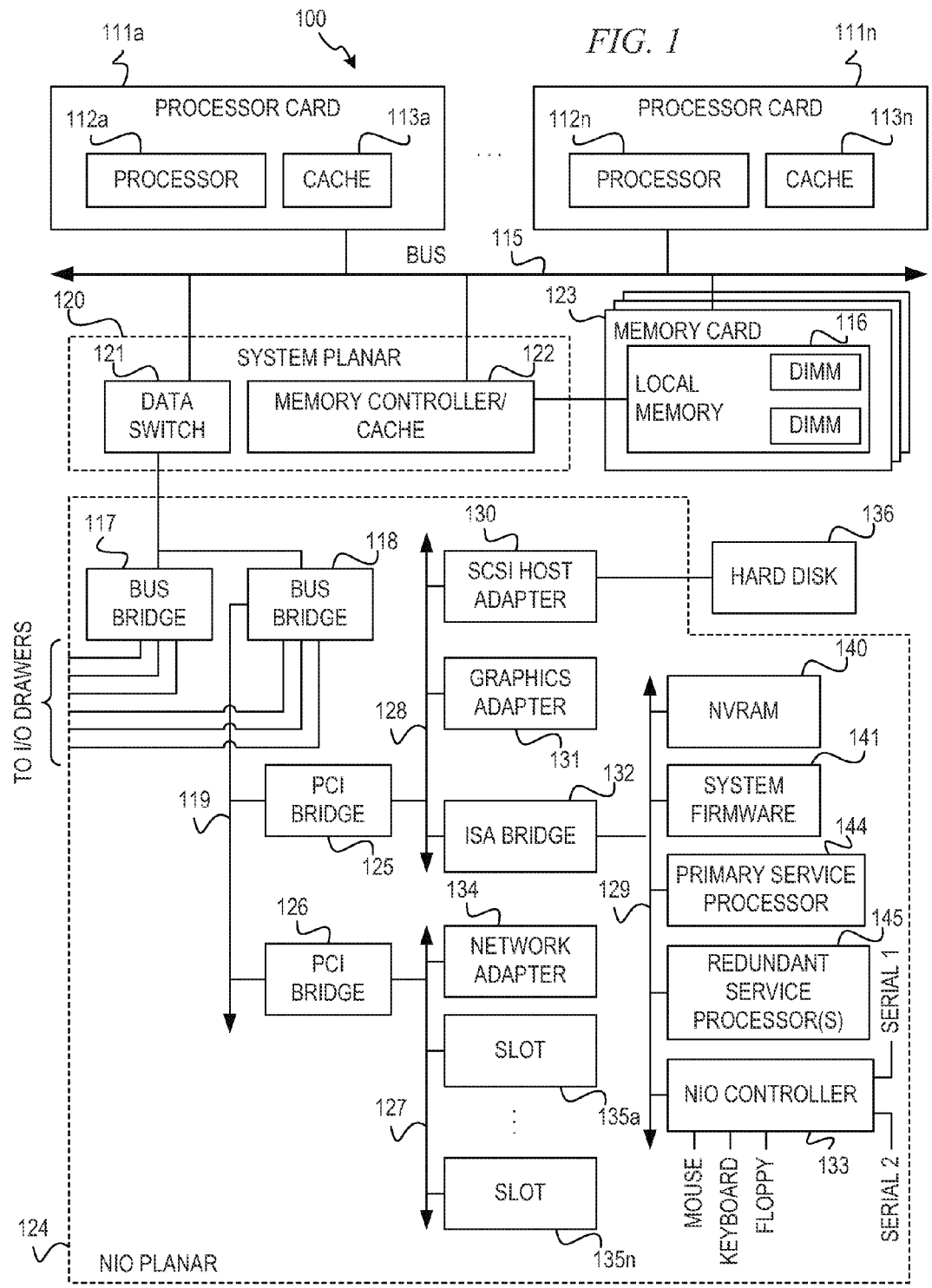
FIG. 1 shows a block diagram of an example data processing system in which aspects of the illustrative embodiments may be implemented.

Thus, the illustrative embodiments may be utilized in many different types of data processing environments including a distributed data processing environment, a single data processing device, or the like in order to provide a context for the description of the specific elements and functionality of the illustrative embodiments, FIG. 1 is provided hereafter as an example environment in which aspects of the illustrative embodiments may be implemented. It should be appreciated that FIG. 1 is only one example and is not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 shows a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 includes processor cards 111a-111n. Each of processor cards 111a-111n includes a processor and a cache memory. For example, processor card 111a contains processor 112a and cache memory 113a, and processor card 111n in contains processor 112n and cache memory 113n.

Processor cards 111a-111n are connected to main bus 115. Main bus 115 supports a system planar 120 that contains processor cards 111a-111n and memory cards 123. The system planar also contains data switch 121 and memory controller/cache 122. Memory controller/cache 122 supports memory cards 123 that include local memory 116 having multiple dual in-line memory modules (DIMMs).

Data switch 1121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via. PCI bus 128, As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via PCI bus 127.

An industry standard architecture (ISA) bus 129 connects to PCI bus 128 via ISA bridge 132, ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A primary service processor 144 and one or more redundant service processors 145 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

Figure 2:
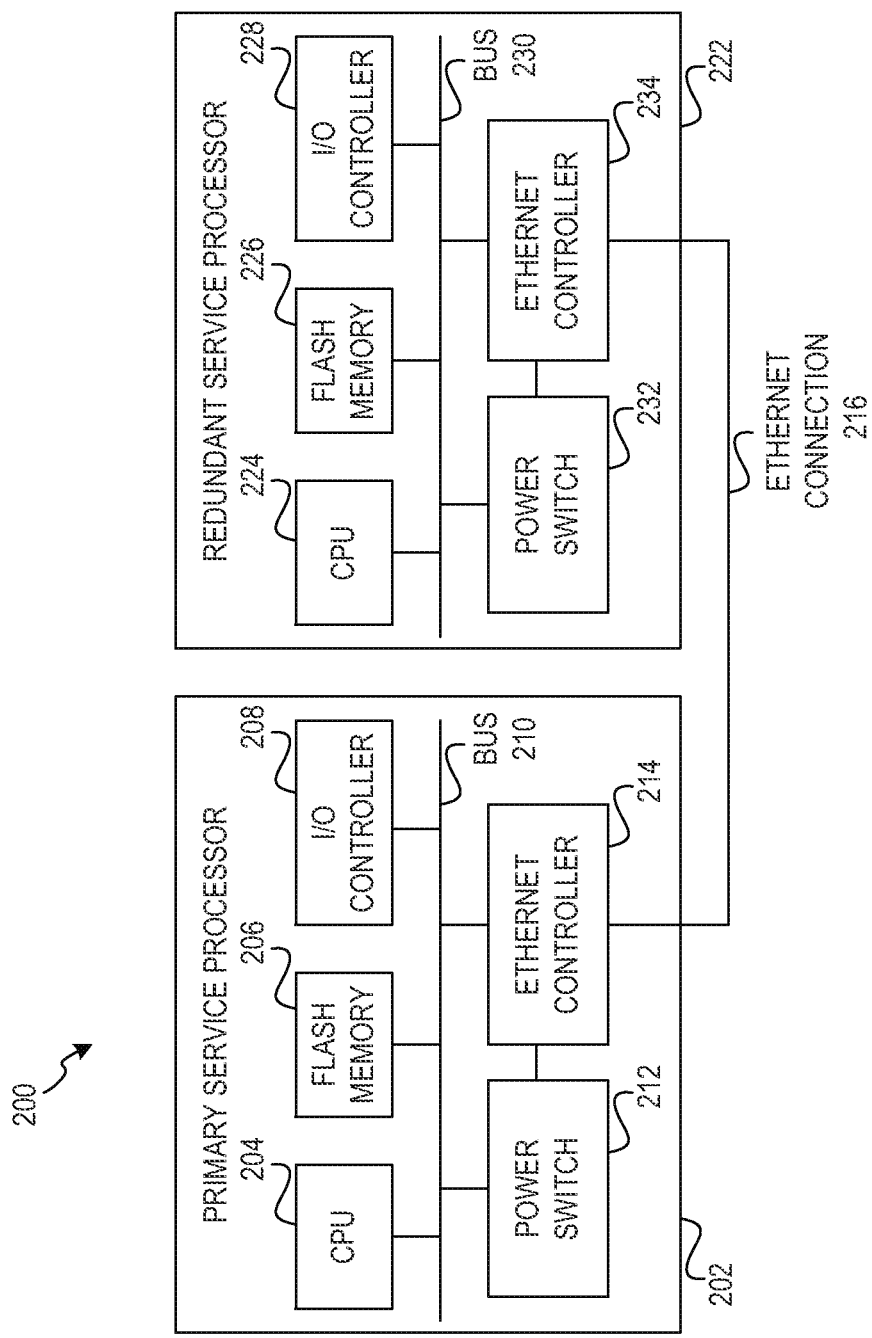
FIG. 2 depicts an exemplary block diagram of a mechanism saving power in redundant service processors of a computing system in accordance with an illustrative embodiment.

FIG. 2 depicts an exemplary block diagram of a mechanism saving power in redundant service processors of a computing system in accordance with an illustrative embodiment. In this example, data processing system 200 comprises primary service processor 202 and redundant service processor 222. While this example only shows one redundant service processor, one of ordinary skill in the art would recognize that the mechanisms of the illustrative embodiments could be implemented with one or more redundant service processors without departing from the spirit and scope of the invention. Primary service processor 202 comprises a central processing unit 204, flash memory 206, and input/output (I/O) controller 208, which may be coupled together via bus 210 and controlled by power switch 212, which may be a software controlled power switch, a hardware controlled power switch, or a power switch controlled using a combination of software and hardware. Primary service processor 202 also comprises Ethernet controller 214. Ethernet controller 214 sends and receives signals to and from redundant service processor 222 via Ethernet connection 216.

Similar to the configuration of primary service processor 202, redundant service processor 222 comprises a central processing unit 224, flash memory 226, and input/output WO) controller 228, which may be coupled together via bus 230 and controlled by software controlled power switch or power switch 232. Redundant service processor 222 also comprises Ethernet controller 234, which sends and receives signals to and from primary service processor 202 via Ethernet connection 216.

Both primary service processor 202 and redundant service processor 222 are capable of initializing chips during boot-up and after a failure of data processing system 200 in order to collect data and recover data processing system 200 in the event of a failure. Once data processing system 200 is initialized, both primary service processor 202 and redundant service processor 222 monitor data processing system 200 for errors or events.

During boot-up of data processing system 200, primary service processor 202 sends a primary control signal via Ethernet controller 214 to redundant service processor 222 indicating primary control of data processing system 200. Before booting up, redundant service processor 222 receives the primary control signal via Ethernet controller 234 which is forwarded to power switch 232. Upon receiving the primary control signal, power switch 232 places components of redundant service processor 222, other than Ethernet controller 234, as well as itself into a tow power state while primary service processor 202 initializes and runs data processing system 200. By redundant service processor 222 only keeping a portion of its circuitry active to monitor primary service processor 202, redundant service processor 222 consumes far less power than if redundant service processor 222 were active and running all the time.

During runtime, Ethernet controller 234 monitors Ethernet connection 216 for an activate signal, such as a "wake-on-lan" packet or similar protocol, sent by primary service processor 202 when an event occurs such as a reset of primary service processor 202, when primary service processor is about to crash, or similar events. Upon receiving such an activate signal, Ethernet controller 234 sends a signal to power switch 232 that causes power switch 232 to wake-up the components that are in a low-power state in order to collect data and recover data processing system 200 in the event of a failure.

There may be events where primary service processor 202 may fail or go down without warning. In order to handle such events, Ethernet controller 214 sends a heartbeat signal via Ethernet connection 216 to Ethernet controller 234. If Ethernet controller 234 fails to receive the heartbeat signal for a predetermined length of time, Ethernet controller 234 sends a signal to power switch 232 that causes power switch 232 to wake-up the components that are in a low-power state in order to collect data and recover data processing system 200 in the event of a failure.

Thus, components of redundant service processor 222 may be placed in a low power state during boot and runtime while primary service processor 202 initializes and runs data processing system 200. Redundant service processor 222 keeps a portion of its circuitry, Ethernet controller 234, active to monitor primary service processor 202. By keeping a portion of redundant service processor 222 in a low power state, redundant service processor 222 consumes far less power than if it were active and running all the time. If there is a fault in primary service processor 202 or if there is a failover request from primary service processor 202, the components of redundant service processor 222 wake up in order to collect data and recover data processing system 200 in the event of a failure.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is nota computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RE), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 3:
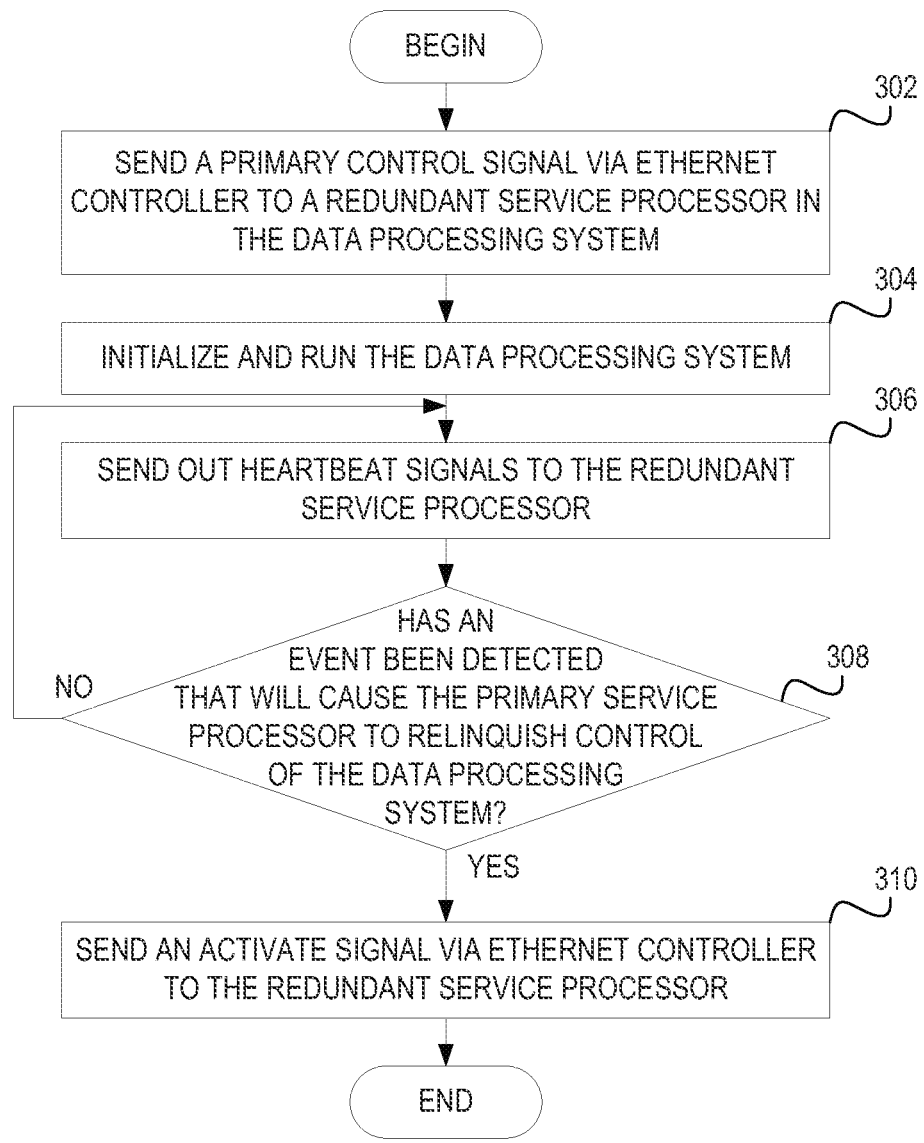
FIG. 3 shows an example operation of a process performed by a primary service processor in saving power in redundant service processors of a data processing system in accordance with an illustrative embodiment and FIG. 4 depicts an example operation of a process performed by a redundant service processor in saving power in redundant service processors of a data processing system in accordance with an illustrative embodiment.
Figure 4:
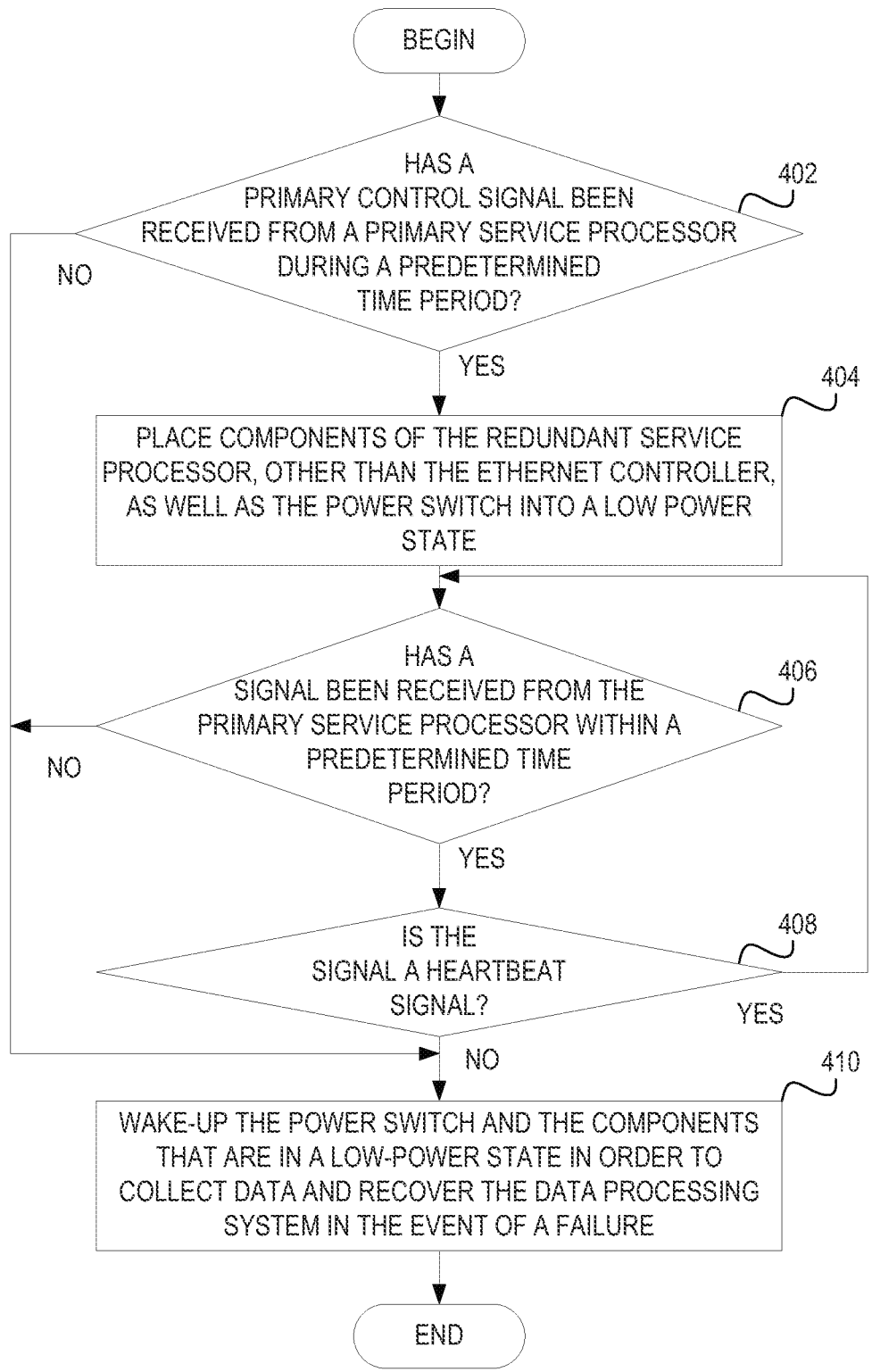

Referring now to FIGS. 3 and 4, these figures provide flowcharts outlining example operations of saving power in redundant service processors of a data processing system in accordance with an illustrative embodiment. Referring now to FIG. 3, an example operation is shown of the process performed by a primary service processor in saving power in redundant service processors of a data processing system in accordance with an illustrative embodiment. As the operation begins and a data processing system initializes, the primary service processor sends a primary control signal via its own Ethernet controller to a redundant service processor in the data processing system (step 302). The primary control signal indicates that the primary service processor is asserting primary control of the data processing system. The primary service processor then initializes and runs the data processing system (step 304). During runtime, the primary service processor sends out heartbeat signals to the redundant service processor that indicate to the redundant service processor that the primary service processor is still in control of the data processing system (step 306).

The primary service processor then monitors the data processing system to determine whether an event has been detected that will cause the primary service processor to relinquish control of the data processing system, such as a reset of the primary service processor, when primary service processor is about to crash, or similar events (step 308). If at step 308 such an event does not occur, then the operation returns to step 306. If at step 308 such an event occurs, then the primary service processor sends an activate signal via its Ethernet controller to the redundant service processor (step 310), with the operation of the primary service processor ending thereafter. Once the primary service processor finishes resetting or is restored, then the redundant service processor may regain control and operate as is described above or may be placed into a tow power state and operate as is shown in FIG. 4.

FIG. 4 depicts an example operation of the process performed by a redundant service processor in saving power in redundant service processors of a data. processing system in accordance with an illustrative embodiment. As the operation begins and a data processing system initializes, a redundant service processor determines whether a primary control signal has been received from a primary service processor in the data processing system during a predetermined time period (step 402). If at step 402 a primary control signal is received from the primary service processor within the predetermined time period, a power switch within the redundant service processor places components of the redundant service processor, other than the Ethernet controller, as well as the power switch itself into a low power state (step 404). The Ethernet controller of the redundant service processor then monitors an Ethernet connection to the primary service processor for a signal within a predetermined time period (step 406).

If at step 406 a signal is received within the predetermined time period, the Ethernet controller determines whether the signal is a heartbeat signal (step 408). If at step 408 the signal is a heartbeat signal, the operation returns to step 406. If at step 408 the signal is not a heartbeat signal but rather an activate signal, then the Ethernet controller sends a signal to the power switch that causes power switch to wake-up and the power switch to wake-up the components that are in a low-power state in order to collect data and recover the data processing system in the event of a failure (step 410), with this operation ending thereafter, The redundant service processor may continue to operate as a primary service processor, as is shown in FIG. 3, or once the original primary service processor finishes resetting or is restored, then the redundant service processor may be placed back into a low power state.

If at step 402 a primary control signal is not received from the primary service processor within the predetermined time period or if at step 406 a signal is not received within the predetermined time period, then the operation proceeds to step 410 where the Ethernet controller sends a signal to the power switch that causes power switch to wake-up and the power switch to wake-up the components that are in a low-power state in order to collect data and recover the data processing system in the event of a failure. Again, the redundant service processor may continue to operate as a primary service processor, as is shown in FIG. 3, or once the original primary service processor finishes resetting or is restored, then the redundant service processor may be placed back into a low power state.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown M succession may, in act, be executed substantially concurrently, or the blocks may sometimes be executed in the reverse order, depending upon the functionality involved. will also be noted that each block of the block diagrams and/or flowchart illustration, and combinations of Hocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for placing components of the redundant service processor in a low power state during boot and runtime while the primary service processor initializes and runs the data processing system. The redundant service processor keeps a portion of its circuitry, i.e. the Ethernet controller, active to monitor the primary service processor. By keeping a portion of the redundant service processor in a low power state, the redundant service processor consumes far less power than if it were active and running all the time. If there is a fault in the primary service processor or if there is a failover request from the primary service processor, the components of the redundant service processor wake up in order to collect data and recover the data processing system in the event of a failure.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for saving power in redundant service processors of the data processing system, the method comprising:
    responsive to receiving a primary control signal from a primary service processor within a first predetermined time period, placing, by the redundant service processor, a plurality of components into a low power state, wherein the plurality of components excludes an Ethernet controller of the redundant service processor;
    monitoring, by the redundant service processor, for a signal within a second predetermined time period from the primary service processor;
    responsive to receiving the signal from the primary service processor within the second predetermined time period, determining, by the redundant service processor, whether the signal is a heartbeat signal or an activate signal; and
    responsive to receiving the activate signal, waking-up, by the redundant service processor, the plurality of components that are in the low-power state in order for the redundant service processor to collect data and recover the data processing system in an event of a failure.

2. The method of claim 1, wherein the Ethernet controller of the redundant service processor receives the primary control signal and sends the signal to a power switch and wherein the power switch places the plurality of components as well as itself into the low power state.

3. The method of claim 1, wherein the Ethernet controller of the redundant service processor receives the activate signal and sends the signal to a power switch and wherein the power switch of the redundant service processor wakes-up the plurality of components as well as itself.

4. The method of claim 1, further comprising:
    responsive to a failure to receive the primary control signal from the primary service processor within the first predetermined time period, waking-up, by the redundant service processor, the plurality of components that are in the low-power state in order for the redundant service processor to collect the data and recover the data processing system in the event of a failure.

5. The method of claim 1, further comprising:
    responsive to a failure to receive the signal from the primary service processor within the second predetermined time period, waking-up, by the redundant service processor, the plurality of components that are in the low-power state in order for the redundant service processor to collect the data and recover the data processing system in the event of a failure.

6. The method of claim 1, further comprising:
    responsive to receiving the heartbeat signal, continuing to monitor, by the redundant service processor, for another signal within a third predetermined time period from the primary service processor.

7. A computer program product comprising a non-transitory computer readable storage medium having a computer readable program stored therein, wherein the computer readable program, when executed on a computing device, causes the computing device to:
    responsive to receiving a primary control signal from a primary service processor within a first predetermined time period, place a plurality of components into a low power state, wherein the plurality of components excludes an Ethernet controller of the redundant service processor;
    monitor for a signal within a second predetermined time period from the primary service processor;
    responsive to receiving the signal from the primary service processor within the second predetermined time period, determine whether the signal is a heartbeat signal or an activate signal; and
    responsive to receiving the activate signal, wake-up the plurality of components that are in the low-power state in order for the redundant service processor to collect data and recover the data processing system in an event of a failure.

8. The computer program product of claim 7, wherein the Ethernet controller of the redundant service processor receives the primary control signal and sends the signal to a power switch and wherein the power switch places the plurality of components as well as itself into the low power state.

9. The computer program product of claim 7, wherein the Ethernet controller of the redundant service processor receives the activate signal and sends the signal to a power switch and wherein the power switch of the redundant service processor wakes-up the plurality of components as well as itself.

10. The computer program product of claim 7, wherein the computer readable program further causes the computing device to:
    responsive to a failure to receive the primary control signal from the primary service processor within the first predetermined time period, wake-up the plurality of components that are in the low-power state in order for the redundant service processor to collect the data and recover the data processing system in the event of a failure.

11. The computer program product of claim 7, wherein the computer readable program further causes the computing device to:
    responsive to a failure to receive the signal from the primary service processor within the second predetermined time period, wake-up the plurality of components that are in the low-power state in order for the redundant service processor to collect the data and recover the data processing system in the event of a failure.

12. The computer program product of claim 7, wherein the computer readable program further causes the computing device to:

responsive to receiving the heartbeat signal, continue to monitor for another signal within a third predetermined time period from the primary service processor.

13. An apparatus, comprising:

a processor; and a memory coupled to the processor, wherein the memory comprises instructions which, when executed by the processor, cause the processor to:

responsive to receiving a primary control signal from a primary service processor within a first predetermined time period, place a plurality of components into a low power state, wherein the plurality of components excludes an Ethernet controller of the redundant service processor;

monitor for a signal within a second predetermined time period from the primary service processor;

responsive to receiving the signal from the primary service processor within the second predetermined time period, determine whether the signal is a heartbeat signal or an activate signal; and responsive to receiving the activate signal, wake-up the plurality of components that are in the low-power state in order for the redundant service processor to collect data and recover the data processing system in an event of a failure.

14. The apparatus of claim 13, wherein the Ethernet controller of the redundant service processor receives the primary control signal and sends the signal to a power switch and wherein the power switch places the plurality of components as well as itself into the low power state.

15. The apparatus of claim 13, wherein the Ethernet controller of the redundant service processor receives the activate signal and sends the signal to a power switch and wherein the power switch of the redundant service processor wakes-up the plurality of components as well as itself.

16. The apparatus of claim 13, wherein the instructions further cause the processor to:

responsive to a failure to receive the primary control signal from the primary service processor within the first predetermined time period, wake-up the plurality of components that are in the low-power state in order for the redundant service processor to collect the data and recover the data processing system in the event of a failure.

17. The apparatus of claim 13, wherein the instructions further cause the processor to:

responsive to a failure to receive the signal from the primary service processor within the second predetermined time period, wake-up the plurality of components that are in the low-power state in order for the redundant service processor to collect the data and recover the data processing system in the event of a failure.

18. The apparatus of claim 13, wherein the instructions further cause the processor to:

responsive to receiving the heartbeat signal, continue to monitor for another signal within a third predetermined time period from the primary service processor.

* * * * *